United States Patent
Balachandran et al.

(10) Patent No.: US 6,215,827 B1
(45) Date of Patent: Apr. 10, 2001

(54) SYSTEM AND METHOD FOR MEASURING CHANNEL QUALITY INFORMATION IN A COMMUNICATION SYSTEM

(75) Inventors: Krishna Balachandran, Middletown; Sanjiv Nanda, Plainsboro; Srinivas R. Kadaba, Chatham, all of NJ (US); Richard P. Ejzak, Wheaton, IL (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/044,636

(22) Filed: Mar. 19, 1998

Related U.S. Application Data

(63) Continuation-in-part of application No. 08/921,454, filed on Aug. 24, 1997, now Pat. No. 6,108,374.

(51) Int. Cl.$^7$ ................................................. H04L 23/02
(52) U.S. Cl. ........................ 375/262; 375/265; 375/325; 375/340; 375/341; 714/792; 714/794; 714/795
(58) Field of Search .................................... 375/261, 262, 375/265, 296, 272, 303, 325, 340, 341; 714/791, 792, 794, 795

(56) References Cited

U.S. PATENT DOCUMENTS

| | | | |
|---|---|---|---|
| 5,737,365 | * 4/1998 | Gilbert et al. | 375/224 |
| 5,764,699 | * 6/1998 | Needham et al. | 375/261 |
| 5,905,742 | * 5/1999 | Chennakeshu et al. | 371/43.4 |
| 6,002,715 | * 12/1999 | Brailean et al. | 375/227 |

\* cited by examiner

Primary Examiner—Stephen Chin
Assistant Examiner—Dac V. Ha
(74) Attorney, Agent, or Firm—Wildman, Harrold, Allen & Dixon; Carmen B. Patti

(57) ABSTRACT

A system and method to measure channel quality in terms of signal to interference plus noise ratio for the transmission of coded signals over fading channels in a communication system. A Viterbi decoder metric for the Maximum Likelihood path is used as a channel quality measure for coherent and non-coherent transmission schemes. This Euclidean distance metric is filtered in order to smooth out short term variations. The filtered or averaged metric is a reliable channel quality measure which remains consistent across different coded modulation schemes speeds. The filtered metric is mapped to the signal to interference plus noise ratio per symbol using a threshold based scheme. Use of this implicit signal to interference plus noise ratio estimate is used for the mobile assisted handoff in a cellular system, power control and data rate adaptation in the transmitter.

14 Claims, 12 Drawing Sheets

| CURRENT SCHEME | CONDITIONS ON METRIC | NEW SCHEME |
|---|---|---|
| $C_1$ | $M_i/\mu_2 < \theta_{low}$ | $C_2$ |
| $C_2$ | $M_i/\mu_3 > \theta_{high}$ | $C_1$ |
|  | $M_i/\mu_3 < \theta_{low}$ | $C_3$ |
| $C_3$ | $M_i/\mu_3 > \theta_{high}$ | $C_2$ |

| CURRENT SCHEME | CONDITIONS ON METRIC | NEW SCHEME |
|---|---|---|
| $C_1$ | $M_i/\mu_3 < \theta_{low}$ | $C_3$ |
| $C_2$ | $M_i/\mu_2 > \theta_{high}$ | $C_1$ |
|  | $M_i/\mu_3 < \theta_{low}$ | $C_3$ |
| $C_3$ | $M_i/\mu_3 > \theta_{high}$ | $C_2$ |

SYSTEM AND METHOD FOR MEASURING CHANNEL QUALITY INFORMATION IN A COMMUNICATION SYSTEM

CROSS REFERENCE TO RELATED APPLICATION

This application is a continuation-in-part of U.S. patent application Ser. No. 08/921,454, filed Aug. 24, 1997, now U.S. Pat. No. 6,108,374, entitled "System and Method for Measuring Channel Quality Information", which is not admitted to be prior art by its mention in the background section.

BACKGROUND OF THE INVENTION

The present invention relates generally to digital communication systems and, more particularly, to communications systems which utilize digital transmission schemes.

As communication systems continue to grow worldwide at a rapid pace, the need for frequency spectrum efficient systems that accommodate both the expanding number of individual users and the new digital features and services such as facsimile, data transmission, and various call handling features is evident.

As an example, current wireless data systems such as the cellular digital packet data (CDPD) system and the IS-130 circuit switched time division multiple access data system support only low fixed data rates that are insufficient for several applications. Since cellular systems are engineered to provide coverage at the cell boundary, the signal to interference plus noise ratio (abbreviated as SIR, SNR, or C/(I+N)) over a large portion of a cell is sufficient to support higher data rates. Existing adaptive data rate schemes using bandwidth efficient coded modulation are currently being proposed for increasing throughput over fading channels such as those encountered in mobile radio wireless systems. However, these schemes do not dynamically adjust the coded modulation to adapt to the channel conditions.

Coded modulation schemes with different bandwidth efficiencies have different error rate performances for the same SIR per symbol. As result, at each SIR, the coded modulation scheme that results in the highest throughput with acceptable retransmission delay is desired. Therefore, the detection of channel quality in terms of SIR or achievable frame error rate is very important. As an example, fast and accurate methods to measure either the SIR or to estimate the FER are not available for cellular systems. Thus, there is a need to determine the channel quality based on the measurements, or metrics, of the SIR or the achievable frame error rate (FER) for the time varying channel.

The difficulty in obtaining these metrics in communications systems such as cellular systems is based on the time varying signal strength levels found on the cellular channel. These time varying effects, referred to as fading and distance dependent loss, are the result of the movement of the mobile station (cellular phone) relative to the base station (also known as a cell site). Some recent schemes propose a short-term prediction of the FER, but not the SIR, using the metric for the second best path in a Viterbi decoder. This metric is computationally very intensive and reacts to short term variations in fading conditions. Therefore, there is a need, for an efficient and accurate method for measuring the channel quality in terms of the SIR in a communication system.

Thus, there is a need to determine the channel quality of a communication system based on the measurements (metrics) of the SIR or the achievable frame error rate (FER) for the time varying channel in a digital transmission scheme to obtain a quick and reliable indicator of SIR in noise limited, interference limited and delay spread environments. This need extends for example, to coherent schemes such as M-ary phase shift keying (M-PSK) signaling and non-coherent schemes such as M-DPSK signaling It is also important to measure channel quality, in terms of SIR or FER, for the purpose of mobile assisted handoff (MAHO) and power control. However, FER measurements are usually very slow for the purpose of rate adaptation, power control and handoff. FER as a channel quality metric is slow because it can take a very long time for the mobile to count a sufficient number of frame errors. Therefore, there is a need for a robust short-term channel quality indicator that can be related to the FER.

As a result, channel quality metrics such as symbol error rate, average bit error rate and received signal strength measurements have been proposed as alternatives. The IS-136 standard already specifies measurement procedures for both bit error rate and received signal strength. However, these measures do not correlate well with the FER, or the SIR, which is widely accepted as the meaningful performance measure in wireless systems. Also, received signal strength measurements are often inaccurate and unreliable. Thus, the SIR is a more appropriate as a handoff metric near the cell boundary where signal quality is rapidly changing.

The present invention is directed to overcoming, or at least reducing the effects of one or more of the problems set forth above.

SUMMARY OF THE INVENTION

This invention and methods are directed to determining the SIR for a digital communication system with a fading channel. While the following examples are directed to wireless communications such as cellular telephones the invention and methods descried apply equally well to non-wireless communications.

In this invention, the above problems discussed in the background of the prior art are solved, and a number of technical advances are achieved in the art by use of the appropriate weighted decoder metric for the maximum likelihood path as a measure of the SIR per symbol.

In accordance with one aspect of the present invention a system and method is provided for determining the path metrics of the communication system corresponding to a set of predetermined SIR values. A digital signal is received and a path metric determined for the digital signal. Mapping of the path metric is provided to a corresponding SIR in the set of predetermined SIR values.

These and other features and advantages of the present invention will become apparent from the following detailed description, the accompanying drawings and the appended claims. While the invention is susceptible to various modifications and alternative forms, specific embodiments have been shown by way of example in the drawings and will be described in detail. However, it should be understood that the invention is not intended to be limited to the particular forms disclosed. Rather, the invention is to cover all modifications, equivalents and alternatives falling within the spirit and scope of the invention as described in the appended claims.

BRIEF DESCRIPTION OF THE DRAWINGS

The advantages of this invention will become apparent upon reading the following detailed description and upon reference to the drawings in which.

DETAILED DESCRIPTION

Figure 1:
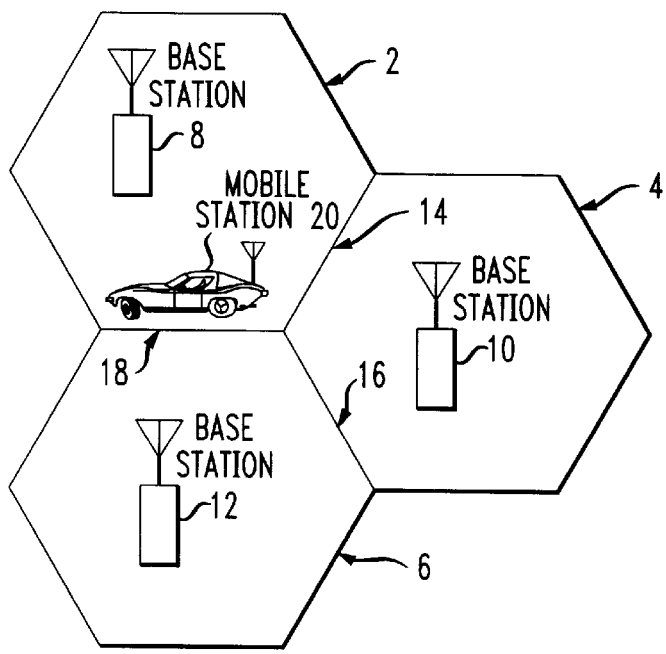
FIG. 1 is a graphical representation of three cell sites within a cluster.

Turning now to the drawings and referring initially to FIG. 1, a plurality of cells 2, 4, and 6 in a telecommunications system are shown. Consistent with convention, each cell 2, 4, and 6 is shown having a hexagonal cell boundary. Within each cell 2, 4, and 6 are base stations 8, 10, and 12 that are located near the center of the corresponding cell 2, 4, and 6. Specifically, the base station 8 is located within cell 2, base station 10 is located within cell 4, and base station 12 is located within cell 6.

Figure 2:
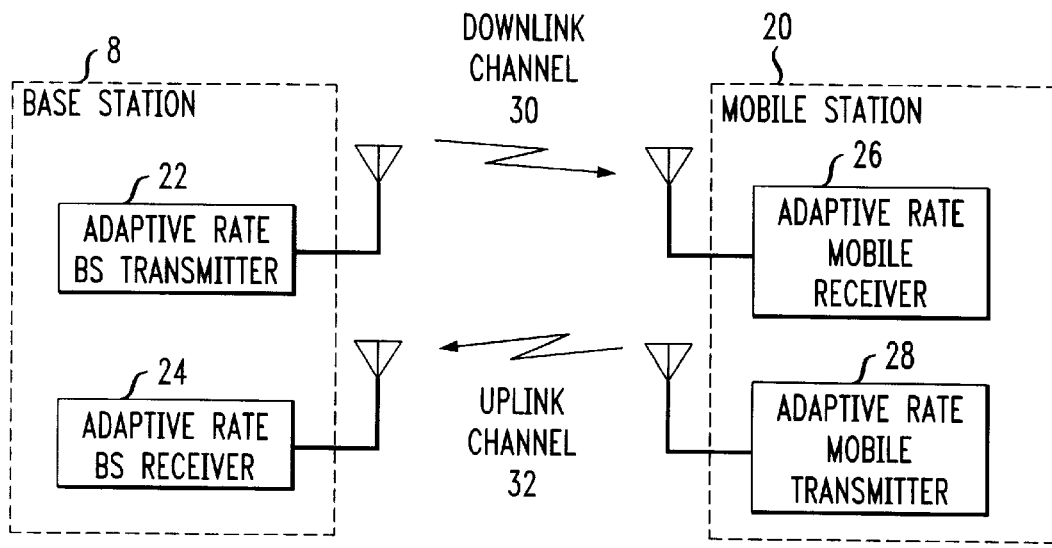
FIG. 2 is a block diagram of both the base station and the mobile station transmitters and receivers for the present invention.

The boundaries 14, 16 and 18 separating the cells 2, 4, and 6 generally represent the points where mobile assisted handoff occurs. As an example, when a mobile station 20 moves away from base station 8 towards an adjacent base station 10, the SIR from the base station 8 will drop below a certain threshold level past the boundary 14 while, at the same time, the SIR from the second base station 10 increases above this threshold as the mobile station 20 crosses the boundary 14 into cell 4. Cellular systems are engineered to provide coverage from each base station up until the cell boundary. Thus, the SIR over a large portion of a cell 2 is sufficient to support higher data rates because the SIR from the base station 8 is greater than the minimum SIR needed to support the data transfer at the boundary 14. FIG. 2 is an example implementation of an adaptive rate system that takes advantage of this support for higher data rates.

FIG. 2 is a block diagram for the schematic of the base station 8 and the mobile station 20 for the invention. The base station 8 consists of both an adaptive rate base station transmitter 22 and an adaptive rate base station receiver 24. Likewise, the mobile station 20 also consists of both an adaptive rate mobile station receiver 26 and an adaptive rate mobile transmitter 28. Each pair of the transmitter and the receiver, corresponding to either the base station 8 or mobile station 20, are in radio connection via a corresponding channel. Thus, the adaptive rate base station transmitter 22 is connected through a dowry radio channel 30 to the adaptive rate mobile receiver 26 and the adaptive rate mobile station transmitter 28 is connected through an uplink radio channel 32 to the adaptive rate base station receiver 24. This implementation allows for increased throughput between the base station 8 and the mobile station 20 over both the downlink channel 30 and the uplink channel 32 because of the use of adaptive bandwidth efficient coded modulation schemes.

Thus, the information rate may be varied by transmitting at a fixed symbol rate (as in IS-130/IS-136), and changing the bandwidth efficiency (number of information bits per symbol) using a choice of coded modulation schemes. However, coded modulation schemes with different bandwidth efficiencies have different error rate performance for the same SIR per symbol. At each SIR, the coded modulation scheme is chosen which results in the highest throughput with acceptable FER and retransmission delay. Therefore, detection of channel quality in terms of SIR or achievable FER is very important for this invention. Both the SIR and FER as channel quality metrics can be derived from the appropriately weighted cumulative Euclidean distance metric corresponding to a decoded received sequence.

Figure 3:
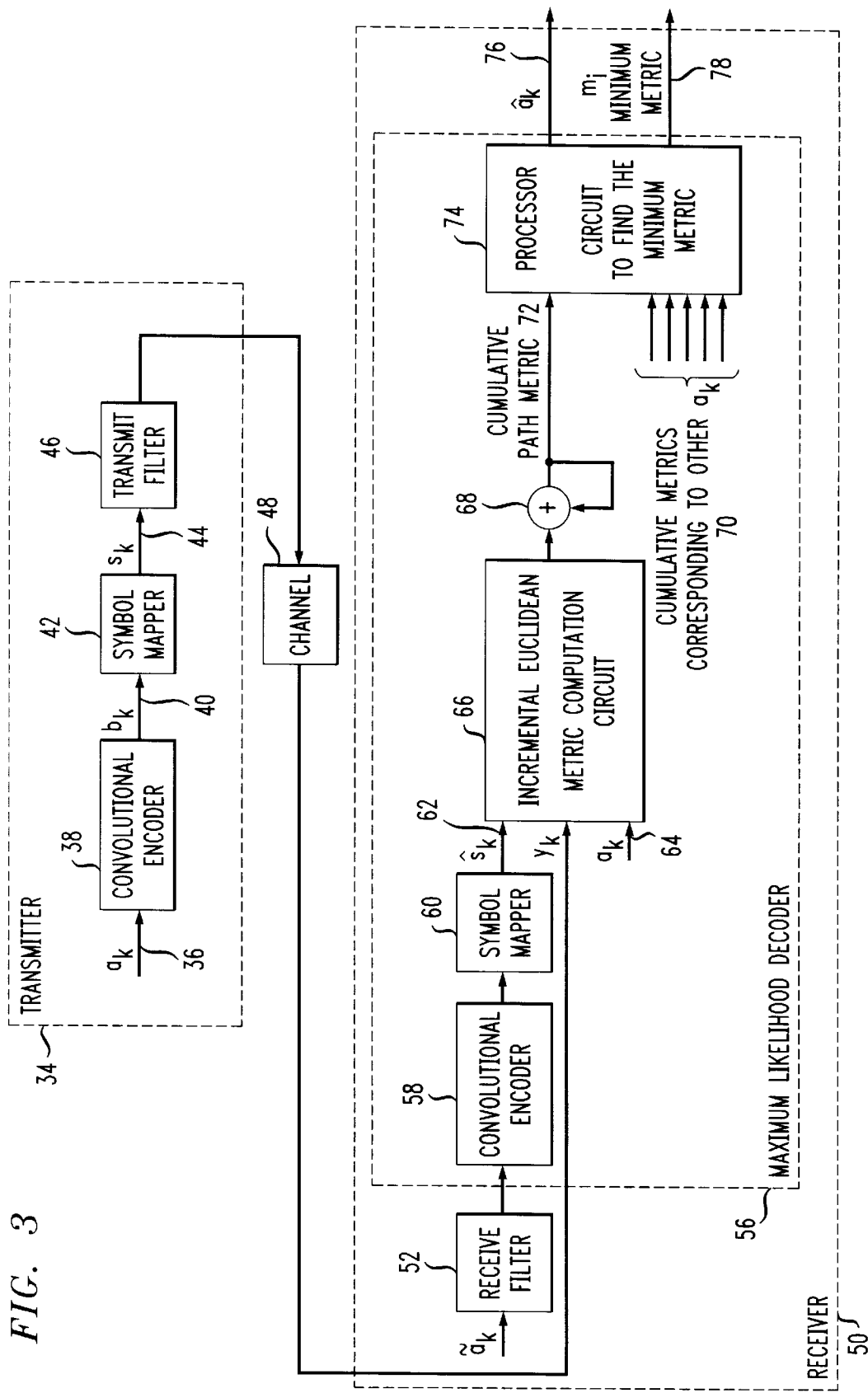
FIG. 3 is a block diagram of a coherent decoder system for present invention.

A block diagram of a encoder and decoder for use with a coherently modulated system in accordance with the invention is shown in FIG. 3. A transmitter 34 receives an information sequence $\{a_k\}$ 36 which is encoded using a convolutional encoder 38 to provide a coded sequence $\{b_k\}$ 40. The coded sequence $\{b_k\}$ 40 is then mapped through a symbol mapper 42 to a symbol $\{s_k\}$ 44 from either an M-ary constellation such as M-ary phase shift keying (M-PSK) or a M-ary quadrature amplitude modulation (M-QAM) scheme using either a straightforward Gray mapping or a set partitioning technique. Pulseshaping is then carried out using transmit filters 46 that satisfy the Gibby Smith constraints (i.e. necessary and sufficient conditions for zero intersymbol interference). The symbol $\{s_k\}$ 44 is then transmitted through the channel 48 to a receiver 50. At the receiver 50, the front end analog receive filters 52 are assumed to be matched to the transmit filters 46 and an output $\{r_k\}$ 54 is sampled at the optimum sampling instants.

The received symbol at the $k^{th}$ instant is given by $$r_k = a_k s_k + n_k,$$

where $s_k$ denotes the complex transmitted symbol $\{s_k\}$ 44, $a_k$ represents the complex fading channel 64 coefficient and $n_k$ denotes the complex additive white Gaussian noise (AWGN) with variance $N_o$. For this example, the fading channel 64 is assumed to be correlated, and may be represented by a number of models. In this example the Jakes' model for Rayleigh fading is used. The convolutional encoder 38 is chosen to optimize the needs of the system. Here, a trellis code was chosen, however, many other codes could also be used by this invention without modifying the essence of the invention. Maximum likelihood decoding at the receiver 50 may be carried out using a Viterbi algorithm circuit, also known as a maximum likelihood decoder (MLD) 56 to search for the best path through a trellis. An estimate of the complex fading channel 64 coefficients is assumed available to the decoder (i.e. the convolutional encoder 58) of the receiver 50.

The Viterbi algorithm circuit of the MLD 56 associates an incremental Euclidean distance metric with each trellis branch transition and tries to find the transmitted sequence $\{s_k\}$ 44 that is closest in Euclidean distance to the received sequence $\{r_k\}$ 54. The Viterbi algorithm circuit of the MLD 56 processes each possible data sequence $\{\tilde{a}_k\}$ 65 through both a convolutional encoder 58 and symbol mapper 60 to produce a possible decoded sequence $\{\tilde{s}_k\}$ 62. The Viterbi algorithm circuit of the MLD 56 then uses the received sequence $\{r_k\}$ 54 and the estimated channel coefficient $\{a_k\}$ 64 in an incremental Euclidean distance metric computation circuit 66 which computes the incremental Euclidean distance. The incremental Euclidean distance metric is then processed through a cumulative feedback loop 68 that produces the cumulative path metric 72. Next, the cumulative path metric 72 and the cumulative metrics corresponding to all other possible transmitted sequences $\{\tilde{a}_k\}$ 70 are inputted into a minimum metric processor circuit 74 which outputs both the decoded data sequence $\{\hat{a}_k\}$ 76 and the minimum metric $m_i$ for the $i^{th}$ block. The cumulative path metric corresponding to the decoded sequence $\{\hat{s}_k\}$ 62 is given by $$m_i = \min_{\tilde{s}_k} \sum_{k=0}^{N-1} |r_k - a_k \tilde{s}_k|^2 = \sum_{k=0}^{N-1} |r_k - a_k \hat{s}_k|^2$$

where $a_k$ 64 is the estimated fading channel coefficient at the $k^{th}$ instant, and the trellis is assumed to terminate at a known state after every N symbols.

While FIG. 3 describes the invention using a coherent modulation system such as M-PSK or M-QAM, the invention also applies a similar metric computational method to a non-coherent modulation system. In the coherent M-PSK system of FIG. 3, the computation of the Euclidean distance metric assumes that the signals are coherently demodulated, and that an estimate of the channel coefficients is available to the receiver. However, a number of useful systems are designed using M-ary differential phase shift keying (M-DPSK) constellations, which are non-coherent systems.

M-DPSK systems such as in the IS-136 standard allow a much simpler receiver structure compared to a coherent system of FIG. 3 because M-DPSK signals are often differentially demodulated prior to decoding. However, at present, like the M-PSK systems there is no fast accurate method to measure either the SIR or to estimate the FER in M-DPSK systems. And unlike the coherent system described in FIG. 3, the determination of the Euclidean distance metric for M-DPSK signals is not directly an accurate measure of the SIR.

Figure 4:
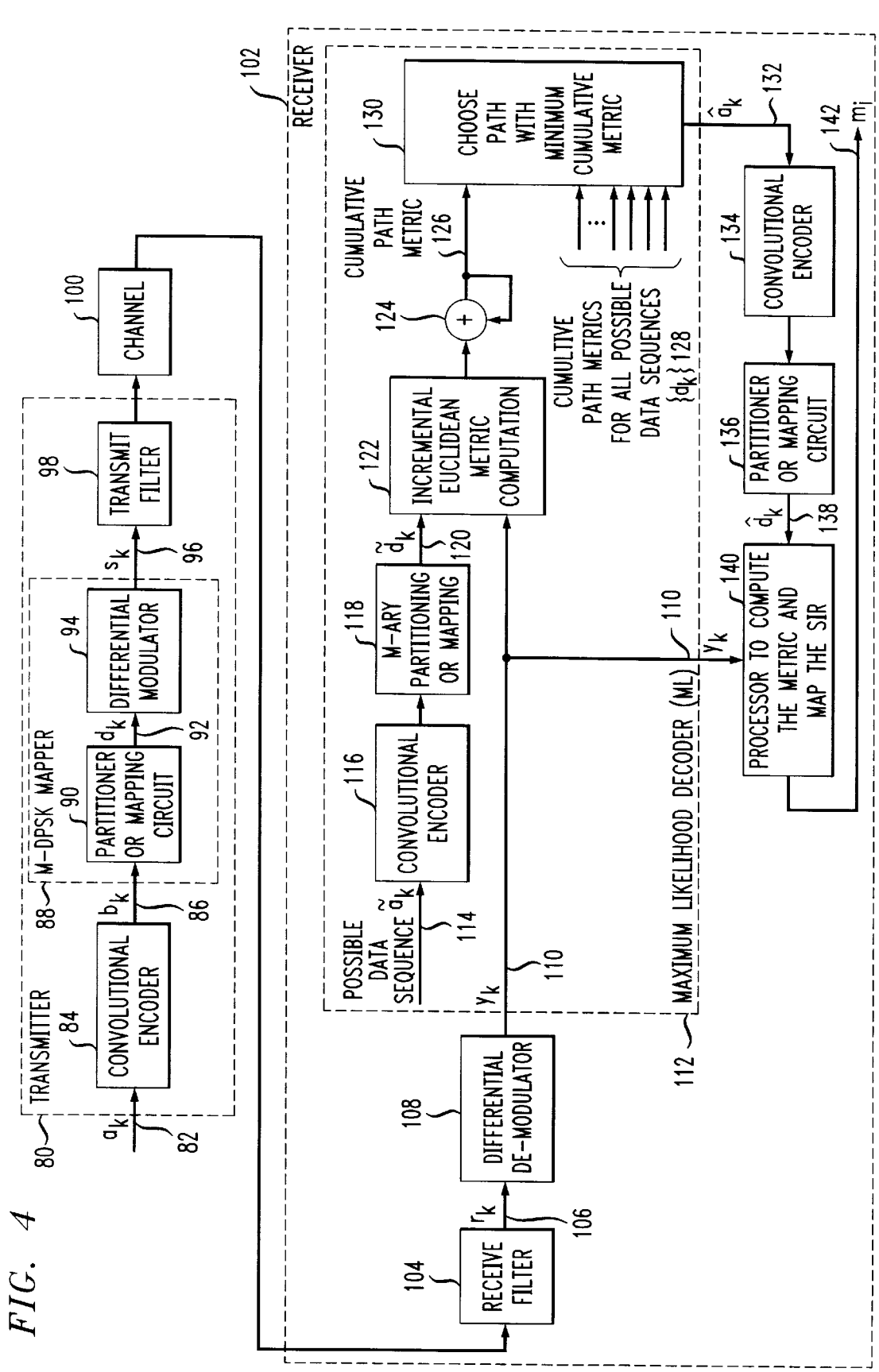
FIG. 4 is a block diagram of a non-coherent decoder system for present invention.

FIG. 4 describes an alternative example that uses an appropriately weighted or scaled Euclidean distance metric for M-DPSK signals which obtains a quick and reliable indicator of SIR in noise limited, interference limited and delay spread environments.

FIG. 4 shows a block diagram of an encoder and decoder for a M-DPSK system. Within the transmitter 80, the information sequence $\{a_k\}$ 82 is encoded using a convolutional encoder 84 to provide a coded sequence $\{b_k\}$ 86. The coded sequence $\{b_k\}$ 86 is then mapped through a M-DPSK symbol mapper 88 to a M-DPSK symbol $\{s_k\}$ 96. The M-DPSK mapping is carried out in two steps. First, coded sequence $\{b_k\}$ 86 is mapped to M-ary symbols, $\{d_k\}$ 92, chosen from an M-ary constellation using either a mapping or partitioning circuit 90. This mapping or partitioning circuit 90 incorporates either a straightforward Gray mapping or a set partitioning technique. Then the M-ary symbols $\{d_k\}$ 92 are differentially modulated in a differential modulator 94 to obtain M-DPSK symbols $\{s_k\}$ 96. Pulse shaping is then carried out using transmit filters 98 that satisfy the Gibby Smith constraints (i.e. necessary and sufficient conditions for zero intersymbol interference). The M-DPSK symbol $\{s_k\}$ 96 is then transmitted through the channel 100 to the receiver 102. At the receiver 102, the front-end analog receive filters 104 are assumed to be matched to the transmit filters 98 and the output $\{r_k\}$ 106 is sampled at the optimum sampling instants.

The received symbol $\{r_k\}$ 106 at the $k^{th}$ instant is given by $$r_k = a_k s_k + \gamma_k i_k + n_k,$$

where $s_k = d_k d_{k-1}$ denotes the complex transmitted symbol $\{s_k\}$ 96, $a_k$ represents the complex fading channel coefficient for the desired signal, $\gamma_k$ denotes the complex fading channel coefficient for an interfering signal, $i_k$, and $n_k$ denotes the complex additive white Gaussian noise (AWGN) with variance $N_o$. For this example, a channel 100 is assumed to be a fading correlated mobile radio channel, and may be represented by a number of models. In this example the Jakes' model for Rayleigh fading is used. The received symbol sequence $\{r_k\}$ 106 is then differentially demodulated through a differential demodulator 108 that produces a demodulated sequence $\{y_k\}$ 110 given by $$y_k = r_k r_{k-1}^*$$

where $r_{k-1}^*$ is the complex conjugate of the $r_{k-1}$.

A Maximum Likelihood Decoder (MLD) 112 maps the demodulated sequence $y_k$ 110 to $\hat{a}_k$ 132. $\hat{a}_k$ 132 is the decoded replica of the transmitted data sequence $a_k$ 82. One realization of the MLD 112 is the well-known Viterbi decoder.

In the Viterbi decoder the set of transmitted M-ary sequences can be mapped on to a trellis state transition diagram. The Viterbi algorithm is used to do a sequential search for the maximum likelihood path through the trellis. However, other realizations, other than the Viterbi decoder are possible for the MLD 112 and are known to those skilled in the art.

As a Viterbi algorithm circuit, the MLD associates an incremental Euclidean distance metric with each trellis branch transition and tries to find the transmitted M-ary sequence $\{\tilde{d}_k\}$ that is closest in Euclidean distance to the demodulated sequence $\{y_k\}$ 110. The MLD 112 processes each possible data sequence $\{\tilde{a}_k\}$ 114 through a convolutional encoder 116 and M-ary partitioning or mapping circuit 118 producing a possible M-ary sequence $\{\tilde{d}_k\}$ 120. The Viterbi algorithm circuit 112 then uses the demodulated sequence $\{y_k\}$ 110 and the M-ary sequence $\{\tilde{d}_k\}$ 120 in an incremental Euclidean distance metric computation circuit 122 which computes the incremental Euclidean distance. The incremental Euclidean distance metric is then processed through a cumulative feedback loop 124 that produces the cumulative path metric 126. Next the cumulative path metric 126 and the cumulative metrics 128 corresponding to all possible M-ary sequence $\{\tilde{d}_k\}$ 120 are input into a minimum metric processor circuit 130 which outputs the decoded data sequence $\{\hat{a}_k\}$ 132. The cumulative path metric 126 corresponding to the M-ary sequence $\{\tilde{d}_k\}$ 120 is given by $$\sum_{k=0}^{N-1} |y_k - \tilde{d}_k|^2.$$

At 130 the path that gives the minimum cumulative Euclidean distance metric is chosen and the corresponding data sequence $\{\hat{a}_k\}$ 132 is the decoded output. The sequence $\{\hat{a}_k\}$ 132 is declared the received data sequence.

To determine the SIR metric the decoded data sequence $\{\hat{a}_k\}$ 132 is encoded using a convolutional encoder 134 and mapped to M-ary sequence $\{\hat{d}_k\}$ 138 by the M-ary Partitioner or mapping circuit 136. The convolutional encoder 134 and M-ary Partitioner or mapping circuit 136 are at the receiver 102 but are identical to the transmitter 80 convolutional encoder 84 and M-ary Partitioner or mapping circuit 90. The weighted Euclidean distance metric $m_i$ 142 that is used as the SIR metric for the $i^{th}$ frame is then computed by the processor 140 using $\{\hat{a}_k\}$ 132 and $\{y_k\}$ 110 as follows:

$$m_i = \sum_{k=0}^{N-1} \frac{|y_k - |y_k|\hat{d}_k|^2}{|y_k|}$$

or alternatively, $$m_i = \frac{\sum_{k=0}^{N-1} |y_k - |y_k|\hat{d}_k|^2}{\frac{1}{N}\sum_{k=0}^{N-1} |r_k|^2}$$

which is easier to compute and yields a better estimate at high SIR values.

Thus, in accordance with at least two aspects of the present invention, the Viterbi decoder is used to derive the channel quality information from the cumulative Euclidean distance metric, for both the coherent and non-coherent systems, corresponding to the decoded trellis path for each block. However, as noted earlier, the Euclidean distance metric has large variations from one block to another in the presence of a fading channel. Thus smoothing, such as averaging, of these variation is required to obtain a good estimate of the metric. A small cumulative Euclidean distance metric would indicate that the received sequence is very close to the decoded sequence. For well-designed trellis codes, this situation would only occur under good channel conditions with high SIR. Under poor channel conditions, the metric is much higher. Thus, a good estimate of the metric can be obtained at the $i^{th}$ block of N symbols by using the following relationship:

$$M_i = aM_{i-1} + (1-a)m_i,$$

for a greater than zero and less than 1.0, where $m_i$ represents the decoded trellis path metric and a represents the filter coefficient which determines the variance of the estimate.

Figure 5:
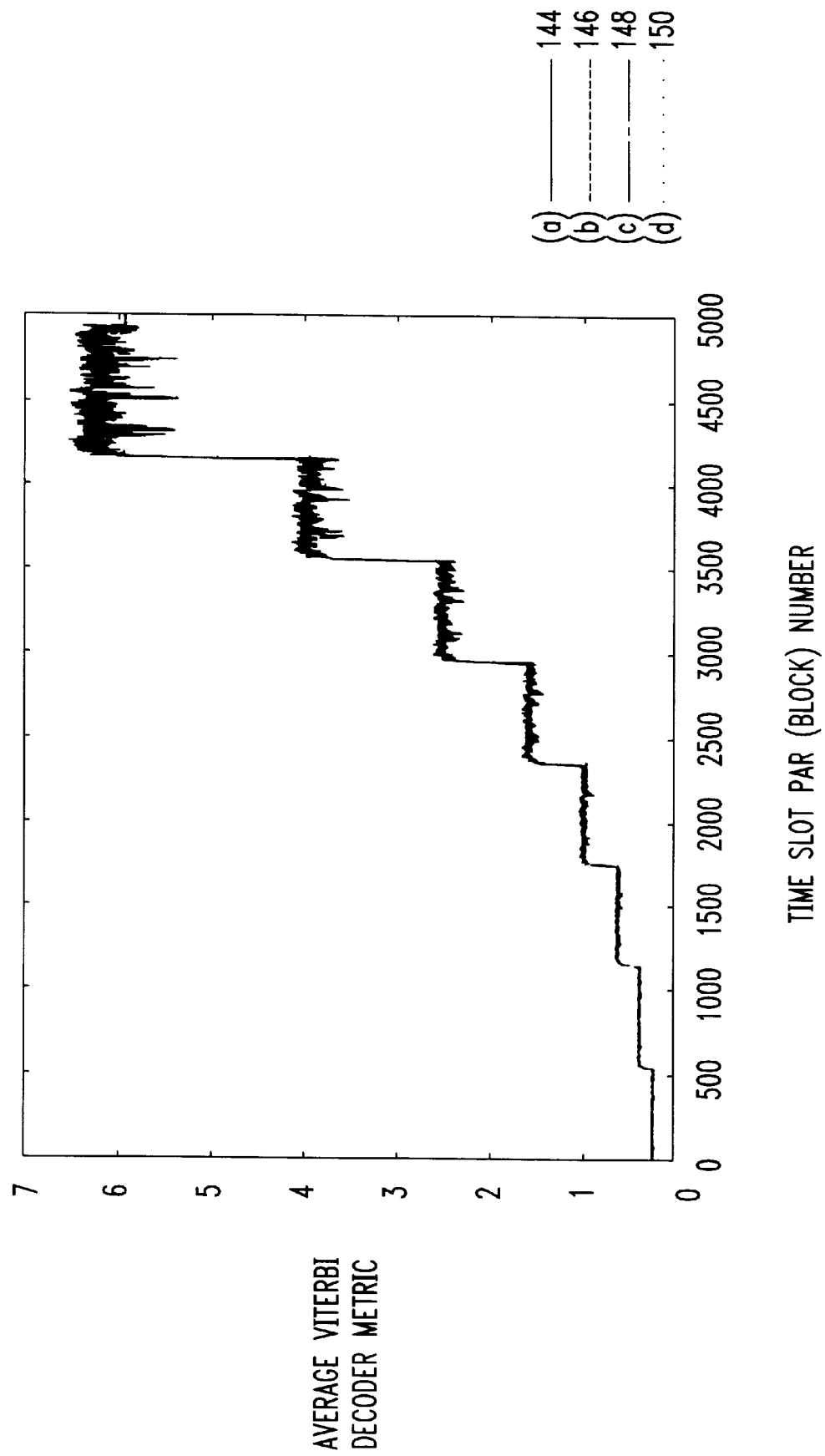
FIG. 5 is a graph having a curve, with the vertical scale representing the average Viterbi decoder metric and the horizontal scale representing the time slot number.

FIG. 5, illustrates a graph having a four curves, with the vertical scale representing the average Viterbi decoder metric $M_i$ and the horizontal scale representing the block number. The solid line curves 144–150 represent the time evolution of the filtered Viterbi decoder metric for a trellis coded 8 PSK scheme and a filter coefficient α equal to 0.9. An IS-130/IS-136 time slot structure (N=260 symbols) is assumed and the trellis is terminated at the end of each time slot pair. The SNR ranges from 30 dB to 16 dB and is decremented in steps of 2 dB after every 600 time slot pairs. Each solid line curve represents a different combination of $f_d$, the doppler frequency, multiplied by T, the symbol duration. Therefore, the solid line curve parameters are as follows: (a)$f_d$T=0.0002 for solid line curve 144, (a)$f_d$T=0.0012 for solid line curve 146; (a)$f_d$T=0.0034 for solid line curve 148; and (a)$f_d$T=0.0069 for solid line curve 150. From FIG. 5, it is clear that there exists a straightforward one to one mapping between the average Euclidean distance metric $M_i$ and the SIR. It maintains a steady level when the SIR is fixed and increases when the SNR decreases.

Figure 6:
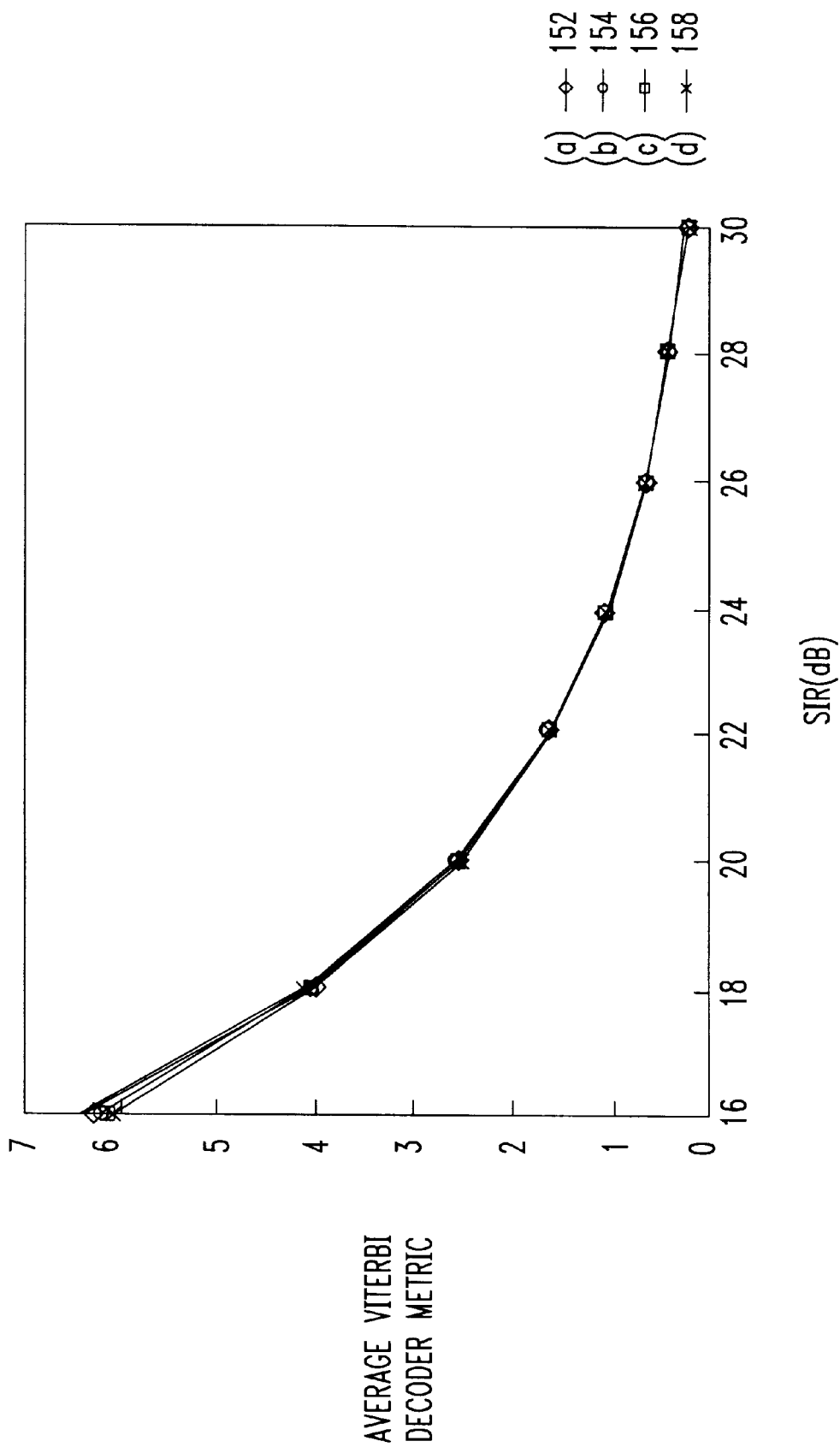
FIG. 6 is a graph having a curve, with the vertical scale representing the average Viterbi decoder metric and the horizontal scale representing the SIR.

FIG. 6 shows a graph having four curves, with the vertical scale representing the long term average Viterbi decoder metric $\mu$ (the expected value of $M_i$) and the horizontal scale representing the SIR. Again, as in FIG. 5, the four curves 152–158 represent different doppler frequencies. From FIG. 6, it is clear that the average metric $\mu$ does not depend on the mobile speed. As a result, the long term cumulative metric average, $\mu$, is the target metric for the present invention. Thus, once the Euclidean metric has been obtained it can be either mapped to the corresponding SIR in a lookup table or through a linear prediction approach.

The long term cumulative metric average $\mu$ and the SIR satisfy the empirical relationship $$SIR = 10\log_{10}\frac{NE_s}{\mu} \text{ in dB,}$$

where $E_s$ is the average energy per transmitted symbol and N is the number of symbols per block. This behavior remains identical across the different coded modulation schemes. Therefore, the average Viterbi decoder metric provides a very good indication of the SIR. Furthermore, the short term average of the metric may be determined using the above mentioned relationship $M_i = aM_{i-1} + (1-a)m_i$. FIG. 5 shows that the short term average satisfies $$\theta_{low} < \frac{M_i}{\mu} < \theta_{high}$$

where the target metric, $\mu$, is obtained from $$SIR = 10\log_{10}\frac{NE_s}{\mu}.$$

The thresholds, $\sigma_{low}$ and $\sigma_{high}$ depend on the standard deviation of $M_i$ which, in turn, is a function of the filter parameter, a. Thus, the present invention incorporates two possible ways to determine the SIR from the average metric $M_i$.

Figure 7:
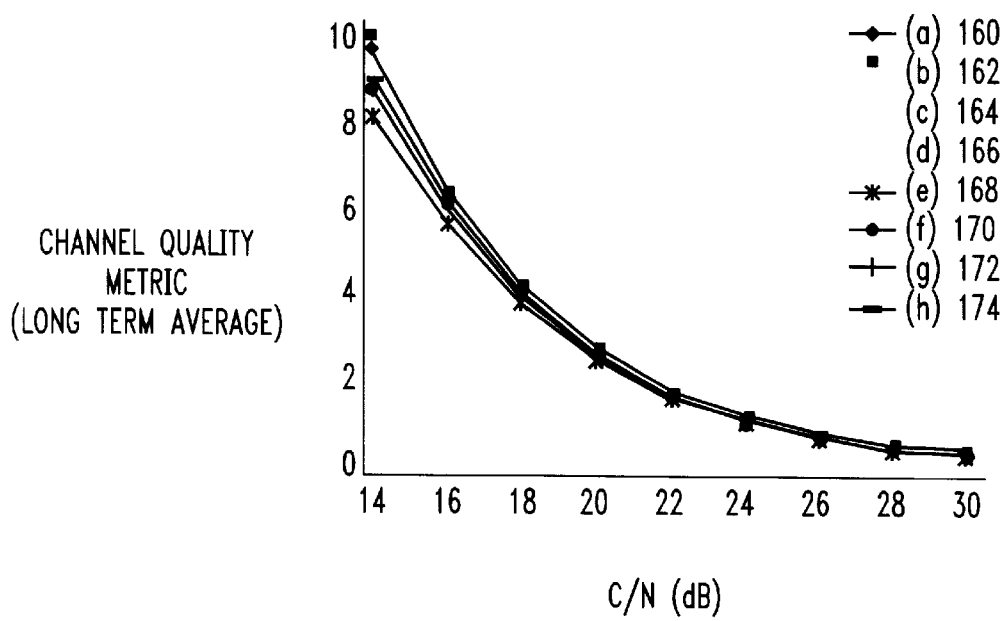
FIG. 7 is a graph having a curve, with the vertical scale representing the long term average of the channel quality metric and the horizontal scale representing the SIR for the voice limited case, with no fading interference.
Figure 8:
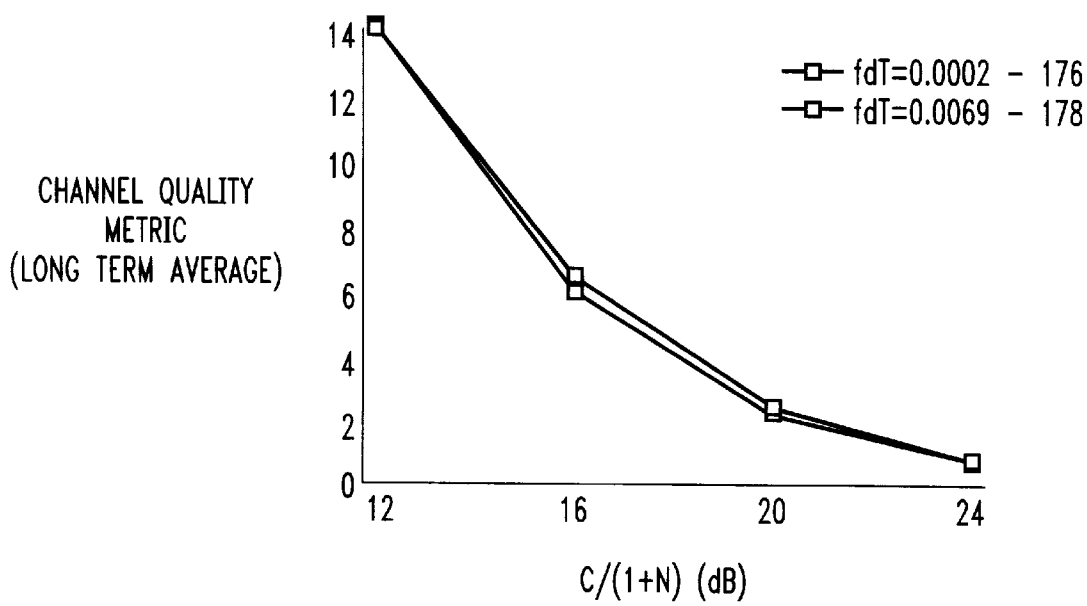
FIG. 8 is a graph having a curve, with the vertical scale representing the long term average of the channel quality metric and the horizontal scale representing the SIR for the interference limited case, with a single dominant interferer at 20 dB above the background noise level.

FIGS. 7 and 8 show the long term average of the channel quality metric for a non-coherent system, as a function of SIR for a rate 5/6 coded DQPSK scheme in noise limited (I=0 in C/(N+I) thus C/N) and interference limited environments respectively. An IS-130/IS-136 time slot structure is assumed, and the trellis is terminated at the end of each time slot pair.

In FIG. 7 the vertical axis represents the values of the long term average of the channel quality metric and the horizontal axis represents the SIR values in a noise limited environment C/N. The C/N ranges from 14 dB to 30 dB in steps of 2 dB. Each curve represents a different combination of the coding scheme and $f_d$, the doppler frequency, multiplied by T, the symbol duration. Therefore, the line curve parameters are as follows: (a) 4-DPSK,$f_dT$=0.0002 for line curve 160; (b) 4-DPSK,$f_dT$=0.0012 for line curve 162; (c) 4-DPSK, $f_dT$=0.0034 for line curve 164; (d) 4-DPSK,$f_dT$=0.0069 for line curve 166; (e) 8-DPSK,$f_dT$=0.0002 for line curve 168; (f) 8-DPSK,$f_dT$=0.0012 for line curve 170; (g) 8-DPSK, $f_dT$=0.0034 for line curve 172; and (h) 8-DPSK,$f_dT$=0.0069 for line curve 174. Thus, from FIG. 7, it is clear that the average metric does not depend on the mobile speed or the choice of coding and modulation.

Additionally, FIG. 8 shows that the long term average channel quality metric is consistent across Doppler frequencies even with fading interferers. FIG. 8 shows plot of the long term average of the channel quality metric versus C/(I+N)(SIR) for a 4-DPSK (I/N=20 dB) coded scheme. The first line curve 176 has $f_dT$=0.0002 while the second line curve 178 has $f_dT$=0.0069.

Figure 9:
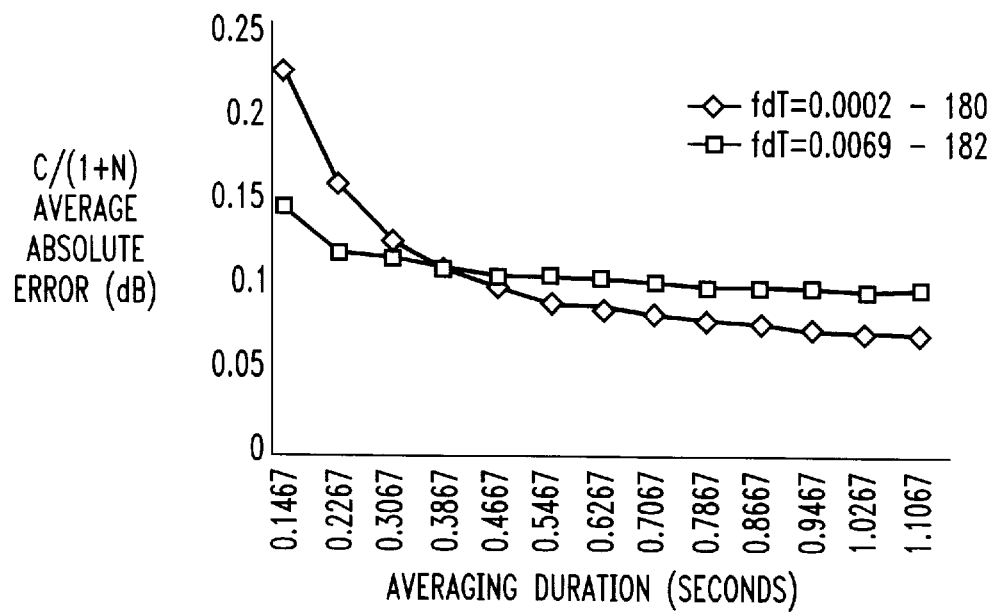
FIG. 9 is a graph having a curve, with the vertical scale representing the SIR average error in dB and the horizontal scale representing the averaging duration for different Doppler frequencies and 0 dB of interference.

FIG. 9 shows the average error of the non-coherent metric. FIG. 9 shows the average error E|{Estimated C/(I+N)—Actual C/(I+N)}| (in dB) as a function of the average duration for a noise limited environment. Noise limited environment means that there are no interferers thus SIR is represented as C/N as in FIG. 7. FIG. 9 has two line curves, 180 and 182, corresponding to $f_dT$=0.0002 and $f_dT$=0.0069 respectively. FIG. 9 shows that at both low and high Doppler frequencies, the error is less that 0.25 dB and thus there is no need to average the metric.

Figure 10:
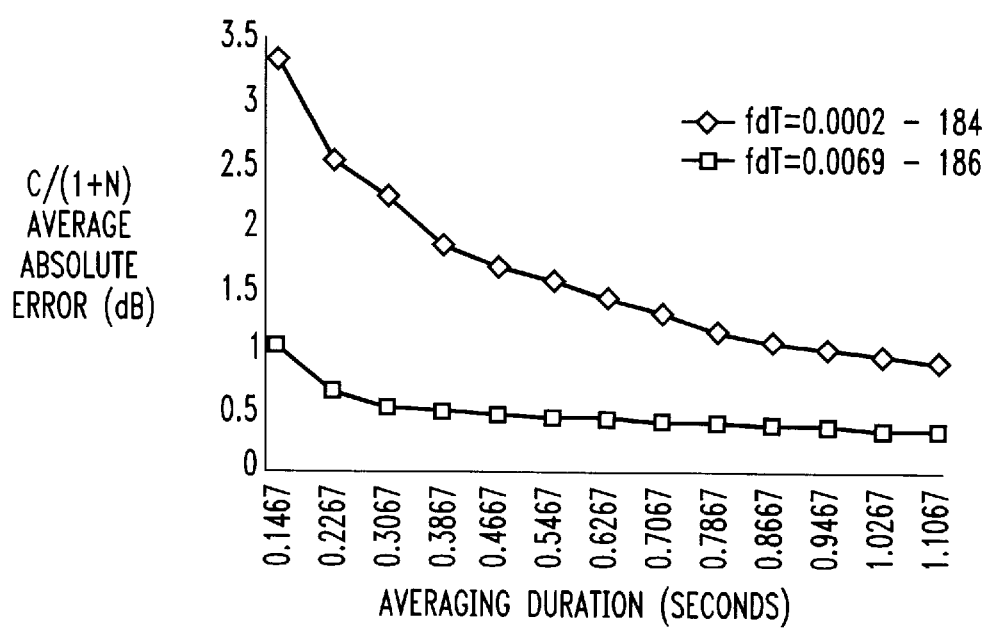
FIG. 10 is a graph having a curve, with the vertical scale representing the SIR average error in dB and the horizontal scale representing the averaging duration for different Doppler frequencies and for the interference limited case, with a single dominant interferer at20 dB above the background noise level.

FIG. 10 shows the C/(I+N) estimation error for the case when a single dominant interfere is present. In this example, the noise is assumed to be 20 dB below the average interferer power thus I/N=20 dB. FIG. 10 has two line curves, 184 and 186, corresponding to $f_dT$=0.0002 and $f_dT$=0.0069 respectively. FIG. 10 shows that at low Doppler frequencies, some averaging may be required in order to obtain a good C/(I+N) estimate.

In view of the invention as described in FIGS. 7–10, one skilled in the art will understand how to achieve the results described in FIGS. 5 and 6 for a M-DPSK transmission system and how to practice the invention in accordance with applications for rate adaptation, handoff and power control as described in the following description in this application.

Figure 11:
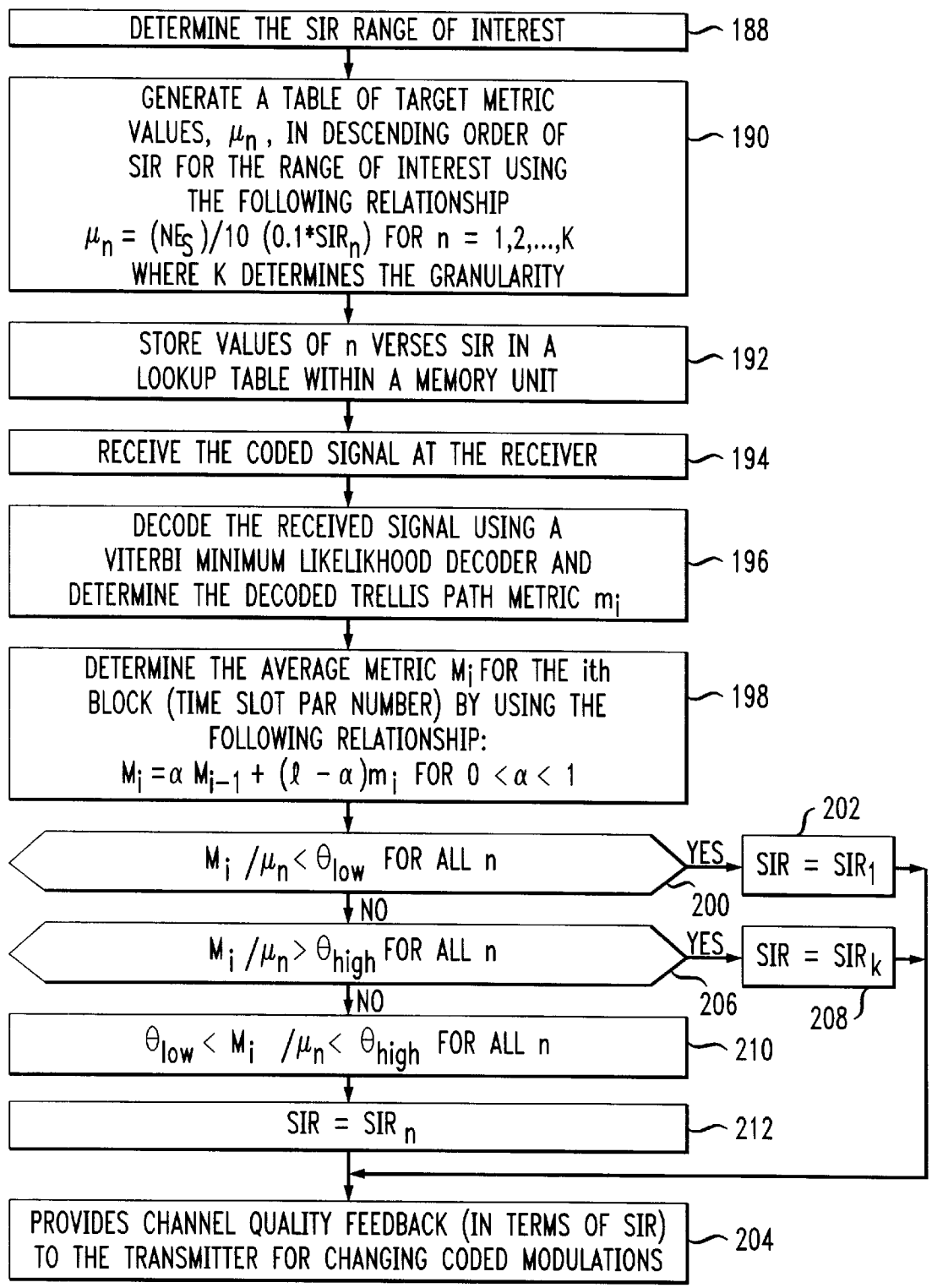
FIG. 11 is a flow diagram illustrating the steps performed during the process of determining the SIR using the lookup table and adjusting the coded modulation scheme used by the system.

FIG. 11 is a flow diagram describing the steps performed by either the base station or the mobile station in determining the SIR from the average metric $M_i$ using a lookup table. The process begins in step 188 in which the cellular network determines the SIR range of interest. This SIR range is determined by the needs of the network at any given time.

The next step 190 is to generate a table of target values $\mu_n$ in descending order of SIR for the determined range of interest. Arrangement in descending order is purely for example and not a necessary or limiting aspect of the process. The target values are determined by the following relationship $$\mu_n = \frac{NE_s}{10^{0.1(SIR_n)}}$$

for n=1, 2, . . . K, where K determines the desired granularity. In step 192, these values of $\mu_n$ versus the corresponding value of SIR are then stored into a memory unit for later use in mapping the measured values of $$\frac{M_i}{\mu_n}$$

to the corresponding SIR values in the lookup table. Once the process of creating and storing the lookup table of $\mu_n$ versus $SIR_n$ is complete, the system is then ready to receive and transmit data information.

In step 194, the receiver receives, for this example, a trellis coded signal and then decodes the received coded signal and outputs the trellis path metric $m_i$ in step 196. For this example, the system uses a Viterbi Minimum Likelihood decoder to determine the trellis path metric $m_i$. Once the trellis path metric $m_i$ is determined the system then determines $M_i$, the average metric for the $i^{th}$ block, in step 198 using the relationship $M_i$=$aM_{i-1}$+(1-a)$m_i$.

The process continues to decision step 200 in which a threshold detector circuit determines whether the value $$\frac{M_i}{\mu_1}$$

is less than the predetermined threshold $\theta_{low}$. If the outcome of the decision step 200 is a "YES" determination, the process continues to step 202. In step 202, the system recognizes that the measured SIR is greater than the $SIR_1$ (the maximum SIR for the range of the lookup table). As a result, the system in step 202 clips the measured SIR to be equal to $SIR_1$. Next, the system in step 204 provides the SIR value $SIR_1$ to the transmitter.

If the outcome of the determination step 200 is a "NO" determination, the process continues instead to decision step 206 in which a second threshold detector circuit determines whether the value $$\frac{M_i}{\mu_k}$$

is greater than the predetermined threshold $\theta_{high}$. If the outcome of the decision step 206 is a "YES" determination, the process continues to step 208. In step 208, the system recognizes that the measured SIR is less than the $SIR_k$ (the minimum SIR for the range of the lookup table). As a result, the system in step 208 clips the measured SIR to be equal to the $SIR_k$. Next, the system in step 204 provides the SIR value $SIR_k$ to the transmitter.

If, on the other hand, the outcome of the determination step 206 is a "NO" determination, the process continues instead to decision step 210 in which a threshold detector circuit determines the threshold $\mu_n$ for which the value $$\frac{M_i}{\mu_n}$$

is both less than the predetermined threshold $\theta_{high}$ and greater than the predetermined threshold $\theta_{low}$. The system in step 212 sets the measured SIR equal to the corresponding $SIR_n$ for the mapped value of $$\frac{M_i}{\mu_n}$$

in the lookup table. As a result, the system in step 204 provides the SIR value $SIR_n$ to the transmitter.

Figure 12:
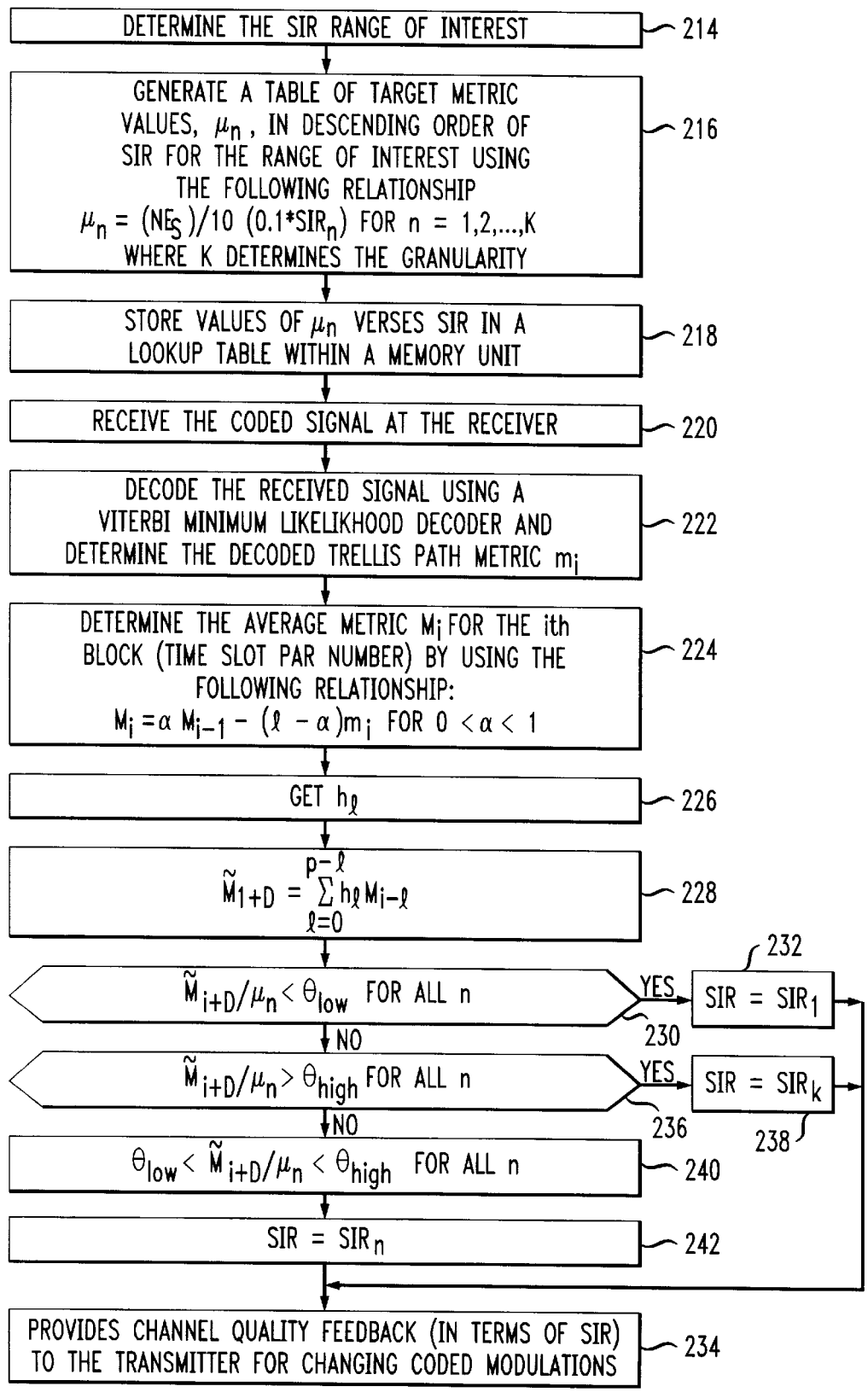
FIG. 12 is a flow diagram illustrating the steps performed during the process of determining the SIR using the linear prediction and adjusting the coded modulation scheme used by the system.

FIG. 12 is a flow diagram describing the steps performed by either the base station or the mobile station in determining the SIR from the average metric $M_i$ using a linear prediction process. The process begins in step 214 in which the cellular network determines the SIR range of interest. Similar to the lookup table approach described earlier, this SIR range is first determined by the needs of the network at any given time. However, the use of a linear prediction, instead of the direct mapping of a lookup table, approach allows the receiver to react faster to the changes of SIR within the cell.

In step 216, a table of target values $\mu_n$, in descending order of SIR, is generated for the determined range of interest. Again, arrangement in descending order is purely for example and not a necessary or limiting aspect of the process. The target values are determined by the following relationship $$\mu_n = \frac{NE_s}{10^{0.1(SIR_n)}}$$

for n=1, 2, . . . K, where K determines the desired granularity. In step 218, these values of $\mu_n$ versus the corresponding value of the SIR are then stored into a first memory unit for later use in mapping the measured values of $$\frac{M_i}{\mu_n}$$

to the corresponding SIR values in the lookup table. Once the process of creating and storing the lookup table of $\mu_n$ versus $SIR_n$ is complete, the system is then ready to receive and transmit data information.

In step 220, the receiver receives a coded signal, a trellis code for the example, and then decodes the received coded signal and outputs the trellis path metric $m_i$ in step 222. Again, for this example, the system uses a Viterbi Minimum Likelihood decoder to determine the trellis path metric $m_i$. Once the trellis path metric $m_i$ is determined, the system then determines $M_i$ the average metric for the $i^{th}$ block in step 224 using the relationship $M_i=aM_{i-1}+(1-a)m_i$. Then in step 226, the values of an optimal $p^{th}$ order linear predictor $h_1$(for 1=0, 1, . . . , p-1) are generate and stored in to a second memory unit for later use. Next, in step 228, the process proceeds and determines the future value of $\tilde{M}_{i+D}$ from the previous values of $\tilde{M}_{i+D}$ using the relation $$\tilde{M}_{i+D} = \sum_{l=0}^{p-1} h_l M_{i-l}.$$

The process continues to decision step 230 in which a threshold detector circuit determines whether the value $$\frac{\tilde{M}_{i+D}}{\mu_1}$$

is less than the predetermined threshold $\theta_{low}$. If the outcome of the decision step 230 is a "YES" determination, the process continues to step 232. The system in step 232 clips the measured SIR to be equal to $SIR_1$. Next, the system in step 234 provides the SIR value $SIR_1$ to the transmitter.

If the outcome of the determination step 230 is a "NO" determination, the process continues instead to decision step 236 in which a second threshold detector circuit determines whether the value $$\frac{\tilde{M}_{i+D}}{\mu_k}$$

is greater than the predetermined threshold $\theta_{high}$. If the outcome of the decision step 236 is a "YES" determination, the process continues to step 238. The system in step 238 clips the measured SIR to be equal to $SIR_k$. Next, the system in step 234 provides the SIR value $SIR_k$ to the transmitter.

If, on the other hand, the outcome of the determination step 236 is a "NO" determination, the process continues instead to decision step 240 in which a threshold detector circuit determines whether the value $$\frac{\tilde{M}_{i+D}}{\mu_n}$$

is both less than the predetermined threshold $\theta_{high}$ and greater than the predetermined threshold $\theta_{low}$. The system in step 242 sets the measured SIR equal to the corresponding $SIR_n$ for the mapped value of $$\frac{\tilde{M}_{i+D}}{\mu_n}$$

in the lookup table. As a result, the system in step 234 provides the SIR value $SIR_n$ to the transmitter.

This linear prediction approach helps the receiver use the current value and p-1 past values of the average metric to predict the channel quality metric D blocks in the future. Thus, this allows the receiver to react quickly to changes in the SIR.

While SIR is the preferred performance measure in the present invention, it is well known that performance is often measured in terms of FER for the forward and reverse links. At a fixed SIR, the FER may often be different at different mobile speeds. In order to obtain a FER indication the SIR should be mapped to the average FER under some wide range of mobility. At each value of SIR, define the weighted sum $$\overline{FER} = \sum_i f_i w_i$$

where $\Sigma w_i=1, f_i$ is the FER at speed $v_i$, the coefficient $w_i$, represents the weight assigned to the speed $v_i$ and $\overline{FER}$ denotes the weighted average FER. By this technique it is possible to use the average metric to determine the SIR which in turn may be mapped to $\overline{FER}$.

As an example of an implemented rate adaptation system using the SIR measurements as a channel quality indicator.

Let $C_1, C_2, \ldots, C_Q$ represent, in ascending order of bandwidth efficiency, the Q different modes of operation schemes for the transmitter. These different schemes may be implemented by using a fixed symbol rate and changing the trellis encoder and symbol mapper to pack a variable number of information bits per symbol. The upper bound on achievable throughput for each $C_j$ at some SIR is given by $R(C_j)(1-\overline{FER}(C_j,SNR))$ where $R(C_j)$ is the data rate corresponding to $C_j$ in bits/second. The actual throughput can be lower as it also depends on higher recovery layers that may time-out during retransmission.

Figures 13, 14:
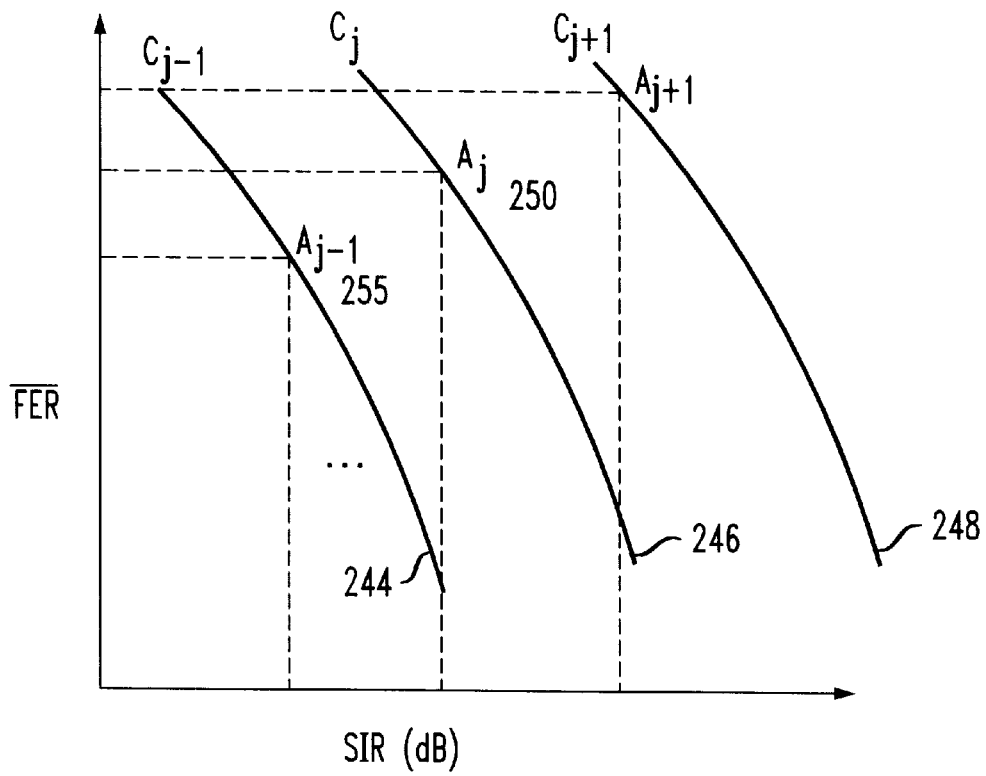
FIG. 13 is a graph having three curves, with the vertical scale representing the $\overline{FER}$ and the horizontal scale representing the SIR.
FIG. 14 is a table of values for a conservative mode adaptation strategy based on a Viterbi algorithm metric average.

FIG. 13, illustrates a graph having a three curves, with the vertical scale representing the $\overline{FER}$ and the horizontal scale representing the SIR. The curves 244, 246, and 248 represent three hypothetical coded modulation schemes. For each coded modulation scheme, $C_j$, $\overline{FER}_j$ is the average FER averaged over mobile speeds. As an example, associated with curve 246 is adaptation point $A_j$ 250. If the SNR falls below this point the transmitter must change its mode from scheme $C_j$ to scheme $C_{j-1}$ and begin operation on curve 244, at $A_{j-1}$ 255, corresponding to scheme $C_{j-1}$, above which $C_j$ has lower throughput than $C_{j-1}$. The filtered Viterbi decoder metric may be used as an indicator of SNR at the mode adaptation point. For the $i^{th}$ decoded block, set $M_i=\tilde{M}_1$ or $M_i=\tilde{M}_{i+D}$ depending on the choice of filter parameter.

$\theta_{high}$ and $\theta_{low}$ are the thresholds which depend on the filter parameter, a. Then, the adaptation rule for the data transmission is as follows: after the $i^{th}$ block, if the transmitter is currently operating with $C_j$ change the mode of operation to $$C_{j-1}, \text{ if } \frac{\tilde{M}_i}{\mu_1} > \theta_{high},$$

for j=2, 3, ..., Q and $$C_{j+1}, \text{ if } \frac{\tilde{M}_i}{\mu_{j+r}} < \theta_{low},$$

for j=1, 2, ..., Q-1
where r=1, 2, ..., Q-j. For each j, the highest allowable value of r maximizes the throughput by permitting an operation at a higher rate in bits per symbol. Finally, filtering of the metric can be applied across the coded modulation schemes since the metric average, $\mu$, is independent of the mobile speed or the coded modulation scheme. Thus, there is no need to reset the channel quality measure after the adaptation.

Applying actual data to this example, FIG. 14 shows a table of values for a conservative mode adaptation strategy based on a Viterbi algorithm metric average. In, FIG. 14, $C_1$, $C_2$, and $C_3$ represent three coded modulation schemes where the choice of $C_1$ results in the lowest data rate and $C_3$ results in the highest data rate. Here, $\mu_1$, $\mu_2$ and $\mu_3$ are the target metrics corresponding to the $\overline{FER}$ adaptation points for the three respective coded modulations. The thresholds $v_{high}$ and $\theta_{low}$ are defined such that $\theta_{high}$ is greater than 1.0 and $\theta_{low}$ less than 1.0. Additionally, FIG. 15 show a table of values for a aggressive mode adaptation strategy based on a Viterbi algorithm metric average.

Figures 15, 16:
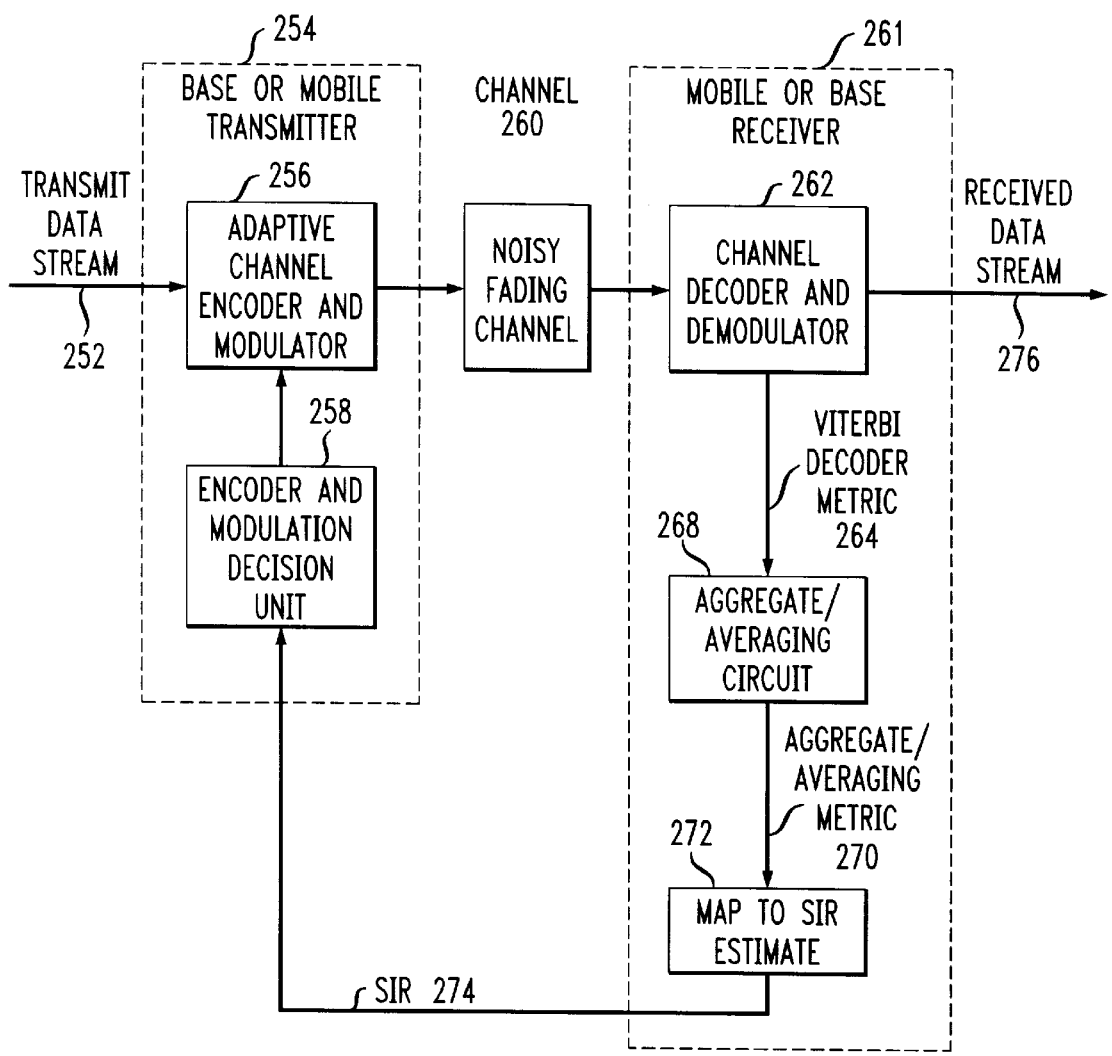
FIG. 15 is a table of values for an aggressive mode adaptation strategy based on a Viterbi algorithm metric average.
FIG. 16 is a block diagram of both the base station and the mobile station transmitters and receivers for the implementation of an adaptive coding scheme.

A block diagram of an adaptive rate system for the invention is shown in FIG. 16. The diagram shows the possible implementation of the system at either the base station or the mobile station. The system operates in the following way. Initially, the system organizes the information to be transmitted into a transmit data stream 252. The transmit data stream 252 is then input into the transmitter 254 of the system. Within the transmitter 254, the transmit data stream 252 is encoded and modulated by the adaptive channel encoder and modulator 256. The encoding and modulation employed by the adaptive channel encoder and modulator 256 is controlled by the encoder and modulation decision unit 258.

The encoder and modulation decision unit 258 determines the correct encoding and modulation scheme in response to the received SIR estimate 274 from the receiver 261. Initially, the encoder and modulation decision unit 258 chooses a predetermined scheme which is input to the adaptive channel encoder and modulator 256. The adaptive channel encoder and modulator 256 then encodes and modulates the transmit data stream 252 to a predetermined scheme and transmits the information through a channel 260 (possibly noisy and fading) to the receiver 261.

After the information is received at the receiver 261 it is input into a channel decoder and demodulator 262 which produces two outputs. The first output of the channel decoder and demodulator 262 is a value of the Viterbi decoder metric 264 for the received information signal. The second output of the channel decoder and demodulator 262 is the received data stream 276 which will be the same as the information sent by the transmit data stream 252 a large fraction of the time. Alternate embodiments may have blocks 272, 258 either both at the transmitter, or both at the received, or as shown in FIG. 16, 272 at the receiver and 258 at the transmitter.

Next, the value of the Viterbi decoder metric 264 is averaged by an aggregate/averaging circuit 268 producing a moving average value for the Viterbi decoder metric 270. The moving average value for the Viterbi decoder metric 270 is then mapped to SIR estimate 274 by a mapping circuit 272. The resulting SIR estimate 274 is fed back into the encoder and modulation decision unit 258 to determine the encoder and modulation scheme to be used corresponding to the SIR estimate 274. The new scheme value of the encoder and modulation decision unit 258 is inputted into the adaptive channel encoder and modulator 256 which switches to the new encoding and modulation scheme for the transmit data stream 252 and transmits the information over the channel 260.

Figure 17:
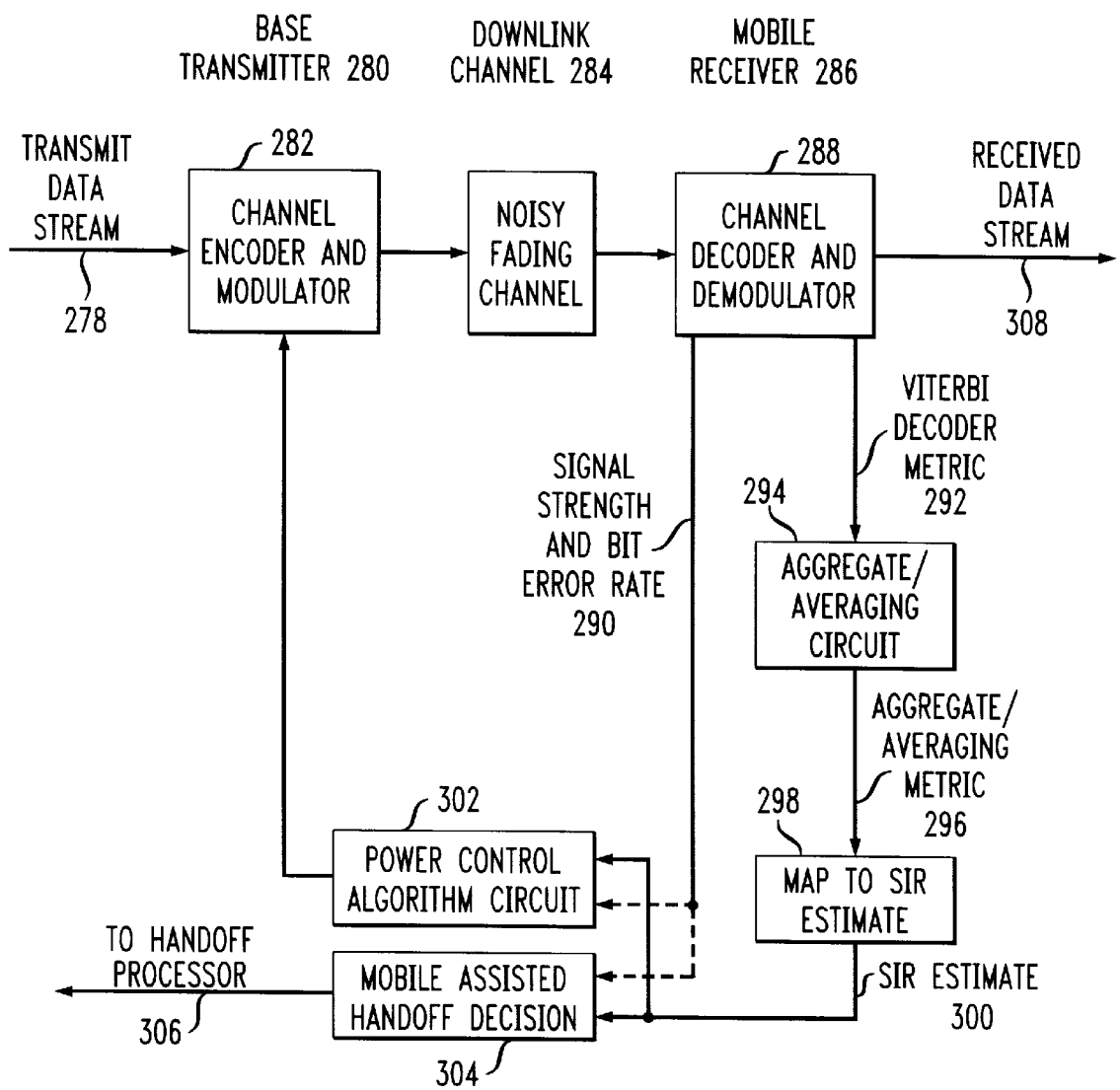
FIG. 17 is a block diagram of both the base station and the mobile station transmitters and receivers for the implementation of a mobile handoff scheme and a power control scheme.

A block diagram of a system using the SIR to do power control and determine mobile handoff is shown in FIG. 17. The diagram shows the possible implementation of the system at either the base station or the mobile station. The system operates in the following way. Initially, the system organizes the information to be transmitted into a transmit data stream 278. The transmit data stream 278 is then input into the transmitter 280 of the system. Within the transmitter 280, the transmit data stream 278 is encoded and modulated by the channel encoder and modulator 282. The transmit power level at the channel encoder and modulator 282 is controlled by the power control algorithm circuit 302.

The power control algorithm circuit 302 may determine the power control level in response to the received SIR estimate 300 from the receiver 286. Additionally, the power control algorithm circuit 302 may also determines the power control level in response to the signal strength and bit error rate estimate 290 from the receiver 286. Initially, the power control algorithm circuit 302 is set to a predetermined value that is input to the channel encoder and modulator 282. The channel encoder and modulator 282 th en encodes and modulates the transmit data stream 278 using a predetermined encoded and modulation scheme and transmits the information at a predetermined power level through a channel 284 possibly noisy and fading) to the receiver 286.

After the information is received at the receiver 286 it is inputted into a channel decoder and demodulator 288 which produces three outputs. The first output of the channel decoder and demodulator 288 is a value of the Viterbi decoder metric 292 for the received information signal. The second output is estimates of the signal strength and bit error rate 290. The third output of the channel decoder and demodulator 288 is the received data stream 308 which should be the same as information sent by the transmit data stream 278.

Next, the value of the Viterbi decoder metric 292 is averaged by an aggregate/averaging circuit 294 producing an average value for the Viterbi decoder metric 296. The average value for the Viterbi decoder metric 296 is then mapped to SIR estimate 300 by a mapping circuit 298. The resulting SIR estimate 300 is fed back into the power control algorithm circuit 302 to determine a power control value corresponding to the SIR estimate 300. The new power control value of the power control algorithm circuit 302 is input into the channel encoder and modulator 282 for use in subsequent transmissions of the data stream 278 over the channel 284 to the receiver.

Additionally, the mobile assisted handoff decision circuit 304 also processes the SIR estimate 300 and the signal strength and bit error rate estimates 290. If the SIR value is below a predetermined threshold the mobile assisted handoff decision circuit 304 sends a message to the handoff processor 306 to handoff the mobile station to a new base station.

In conclusion, the following is a of the invention. The first part of the invention is an apparatus for adaptively changing the modulation schemes of a transmit data stream based on the measured SIR of a channel. The adaptive modulation schemes are implemented in a transmitter by an adaptive channel encoder and modulator. An encoder and modulation decision unit is connected to the transmitter adaptive channel encoder and modulator to determine the correct encoding and modulation scheme based on the information received at the receiver. Then a receiver channel decoder and demodulator is placed in radio connection with the transmitter adaptive channel decoder and demodulator through the channel. This receiver adaptive channel decoder and demodulator produces a path metric value which is averaged by an averaging circuit to produce an averaged path metric value. This averaged path metric value is then mapped through a mapping device to a SIR estimate value. The SIR estimate value is then input into the transmitter encoder and modulation decision unit to determine if the coding and modulation scheme should be changed in response to the SIR estimate value. It should be noted that the receiver channel decoder and modulator may be implemented in various way, however, in this example implementation a Viterbi decoder was used.

The second part of the invention is an apparatus for implementing mobile assisted handoff based on the measured SIR of a channel. The mobile assisted handoff is implemented in a transmitter by a channel encoder and modulator. A receiver channel decoder and demodulator is in radio connection with the transmitter channel decoder and demodulator through a channel. The receiver channel decoder and demodulator produces a path metric value in response to the information received by the receiver which is averaged by an averaging circuit to produce an averaged path metric value. This averaged path metric value is then mapped through a mapping device to a SIR estimate value. A power control algorithm circuit is connected to the transmitter channel encoder and modulator which varies the power level of the transmitter in response to the SIR estimate value. Finally, the SIR estimate value is input into a mobile assisted handoff decision unit that determines if the mobile station should perform a handoff operation based on the SIR estimate value. As in the first part of the invention, it should again be noted that the receiver channel decoder and modulator may be implemented in various way, however, in this example implementation a Viterbi decoder was used. Additionally, this second part of the invention can be either implement at the mobile station or the base station.

Please note that while the specification in this invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrative and not restrictive. To those skilled in the art, the invention is susceptible to additional implementations or embodiments and certain of the details described in this application can be varied considerably without departing from the basic principles of the invention. It will thus be appreciated that those skilled in the art will be able to devise various arrangements which, although not explicitly described or shown herein, embody the principles of the invention and are thus within its spirit and scope. The scope of the invention is indicated by the attached claims.

What is claimed is:

1. A method for determining a signal to interference plus noise ratio, comprising the steps of:

establishing a set of path metrics corresponding to a set of predetermined signal to interference plus noise rations;

receiving a digital signal;

determining a path metric for said digital signal by establishing a set of signal to interference plus noise ratio values that correspond to a set of predetermined short term average of metric values and averaging a decoded path metric; and mapping said path metric to said signal to interference plus noise ratio in said set of predetermined signal to interference plus noise ratios.

2. The method of claim 1, wherein said digital signal is a coded signal.

3. The method of claim 1 wherein said digital signal is a trellis coded signal.

4. The method of claim 1 wherein the step of determining a path metric for said digital signal, further comprises the steps of:

establishing a set of signal to interference plus noise ratio values corresponding to a set of predetermined short term average of metric values, said short term average of metric values defined as M/$\mu$;

determining a decoded path metric from said received digital signal using a decoder, said decoded path metric defined as $m_i$;

averaging $m_i$;

storing in a memory unit said average decoded path metric, said average decoded path metric defined as $\mu$; and determining an estimated Euclidean distance metric defined as $M_i$.

5. The method of claim 4 wherein the step of determining the estimated Euclidean distance metric is performed using the following equation:

$$M_i = aM_{i-1} + (1-a)m_I$$

Where said estimated Euclidean distance metric is defined as Mi and α is a predetermined filter coefficient which is greater than zero and less than 1.0.

6. The method of claim 5 including the steps of:

determining a standard deviation of $M_i$;

determining average metric thresholds defined as $\sigma_{low}$ and $\sigma_{high}$ based on said standard deviation of $M_i$;

determining a value for $M_i/\mu$ by dividing said value of $M_i$ by said value of $\mu$;

mapping said value of $M_i/\mu$ to a minimum value of said corresponding signal to interference plus noise ratio if $M_i/\mu$ is less than $\sigma_{low}$;

mapping said value of $M_i/\mu$ to a maximum value of said corresponding signal to interference plus noise ratio if $M_i/\mu$ is greater than $\sigma_{high}$; and mapping said value of $M_i/\mu$ to said corresponding signal to interference plus noise ratio.

7. The method of claim 4 wherein said decoder is a Viterbi decoder for the maximum likelihood path.

8. A system for determining a signal to interference plus noise ratio, comprising:

means for establishing a set of path metrics corresponding to a set of predetermined signal to interference plus noise ratios;

means for receiving a digital signal;

means for determining a path metric for said digital signal by establishing a set of signal to interference plus noise ratio values that correspond to a set of predetermined short term average of metric values and averaging a decoded path metric; and means for mapping said path metric to said signal to interference plus noise ratio in said set of predetermined signal to interference plus noise ratios.

9. The system of claim 8, wherein said digital signal is a coded signal.

10. The system of claim 8 wherein said digital signal is a trellis coded signal.

11. The system of claim 8 wherein the means for determining a path metric for said digital signal, further comprises:

means for establishing a set of signal to interference plus noise ratio values corresponding to a set of predetermined short term average of metric values, said short term average of metric values defined as $M_i/\mu$;

means for determining a decoded path metric from said received digital signal using a decoder; said decoded path metric defined as $m_i$;

means for averaging $m_i$; and means for storing in a second memory unit said average decoded path metric, said average decoded path metric defined as $\mu$; and means for determining an estimated Euclidean distance metric defined as $M_i$.

12. The system of claim 11 wherein the means for determining the estimated Euclidean distance metric is performed using the following equation:

$$M_i = aM_{i-1} + (1-a)m_I$$

where said estimated Euclidean distance metric is defined as $M_I$ and α is a predetermined filter coefficient which is greater than zero and less than 1.0.

13. The system of claim 12 further comprising:

means for determining a standard deviation of $M_i$;

means for determining average metric thresholds defined as $\sigma_{low}$ and $\sigma_{high}$ based on said standard deviation of $M_i$;

means for determining a value for $M_i/\mu$ by dividing said value of $M_i$ by said value of $\mu$;

means for mapping said value of $M_i/\mu$ to a minimum value of said corresponding signal to interference plus noise ratio if $M_i/\mu$ is less than $\sigma_{low}$;

means for mapping said value of $M_i/\mu$ to a minimum value of said corresponding signal to interference plus noise ratio if $M_i/\mu$ is less than $\sigma_{high}$; and means for mapping said value of $M_i/\mu$ to said corresponding signal to interference plus noise ratio.

14. The system of claim 11 wherein said decoder is a Viterbi decoder for the maximum likelihood path.

* * * * *

UNITED STATES PATENT AND TRADEMARK OFFICE
CERTIFICATE OF CORRECTION

PATENT NO. : 6,215,827 B1
DATED : April 10, 2001
INVENTOR(S) : Balachandran et al.

It is certified that error appears in the above-identified patent and that said Letters Patent is hereby corrected as shown below:

<u>Column 18,</u>
Line 18, delete "$M_i = aM_{i-1} + (1-a)\ m_i$" and insert -- $M_i = \alpha M_{i-1} + (1-\alpha)\ m_i$ --.

Signed and Sealed this

Twenty-third Day of October, 2001

Attest:

NICHOLAS P. GODICI
*Attesting Officer*   *Acting Director of the United States Patent and Trademark Office*